(12) United States Patent
Miyagawa et al.

(10) Patent No.: US 11,421,580 B2
(45) Date of Patent: Aug. 23, 2022

(54) RESERVE TANK

(71) Applicant: DENSO CORPORATION, Kariya (JP)

(72) Inventors: Masashi Miyagawa, Kariya (JP);
Akira Yamanaka, Kariya (JP); Osamu Hakamata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/454,298

(22) Filed: Nov. 10, 2021

(65) Prior Publication Data
US 2022/0065157 A1 Mar. 3, 2022

Related U.S. Application Data

(63) Continuation of application No. PCT/JP2020/017364, filed on Apr. 22, 2020.

(30) Foreign Application Priority Data

May 15, 2019 (JP) ............................. JP2019-092054

(51) Int. Cl.
*F01P 11/02* (2006.01)
(52) U.S. Cl.
CPC ............ *F01P 11/028* (2013.01); *F01P 11/029* (2013.01)
(58) Field of Classification Search
CPC ........ F01P 11/028; F01P 11/029; F01P 11/02; F01P 11/04; F01P 3/20; B01D 45/12; B04C 3/00; B04C 2003/003
See application file for complete search history.

(56) References Cited

U.S. PATENT DOCUMENTS

| 2019/0309674 | A1* | 10/2019 | Han | F01P 11/029 |
|---|---|---|---|---|
| 2021/0001354 | A1* | 1/2021 | Sakata | H05K 7/20272 |
| 2022/0063373 | A1* | 3/2022 | Grouillet | B04C 5/103 |
| 2022/0099017 | A1* | 3/2022 | Sakata | F01P 11/02 |

FOREIGN PATENT DOCUMENTS

| JP | 2015028336 A | 2/2015 |
|---|---|---|
| JP | 2020023965 A | 2/2020 |
| JP | 2020081970 A | 6/2020 |

* cited by examiner

*Primary Examiner* — Jacob M Amick
(74) *Attorney, Agent, or Firm* — Harness, Dickey & Pierce, P.L.C.

(57) ABSTRACT

A reserve tank includes a vapor-liquid separator, an inlet portion, an outlet portion, and a protrusion. The vapor-liquid separator defines an inner space for separating a vapor phase and a liquid phase of a cooling water. The inlet portion defines a first opening through which the cooling water is supplied into the inner space and the outlet portion defines a second opening through which the cooling water is discharged from the inner space. The protrusion protrudes upward from a bottom surface of the vapor-liquid separator. An inner circumferential surface of the vapor-liquid separator and an outer circumferential surface of the protrusion are coaxially provided to define an annular passage in the inner space. The cooling water introduced from the first opening flows spirally in the annular passage.

14 Claims, 9 Drawing Sheets

RESERVE TANK

CROSS REFERENCE TO RELATED APPLICATION

The present application is a continuation application of International Patent Application No. PCT/JP2020/017364 filed on Apr. 22, 2020, which designated the U.S. and claims the benefit of priority from Japanese Patent Application No. 2019-092054 filed on May 15, 2019. The entire disclosures of all of the above applications are incorporated herein by reference.

TECHNICAL FIELD

The present disclosure relates to a reserve tank disposed in a passage through which a cooling water circulates.

BACKGROUND

A vehicle includes a cooling system configured to cool various portions of the vehicle by circulating a cooling water. Targets cooled by the cooling system includes an internal combustion engine and an auxiliary such as an intercooler. In a passage through which the cooling water circulates in the cooling system, a water pump configured to feed the cooling water and a reserve tank configured to reserve a part of the cooling water are disposed other than the targets described above.

SUMMARY

A reserve tank is disposed in a passage through which a cooling water circulates. The reserve tank includes a vapor-liquid separator, an inlet portion, an outlet portion, and a protrusion. The vapor-liquid separator defines therein an inner space for separating a vapor phase and a liquid phase of the cooling water. The inlet portion defines a first opening through which the cooling water is supplied into the inner space. The outlet portion defines a second opening through which the cooling water is discharged from the inner space. The protrusion protrudes upward from a bottom surface of the vapor-liquid separator. An inner circumferential surface of the vapor-liquid separator and an outer circumferential surface of the protrusion are coaxially provided in a cross section along a horizontal surface to define an annular passage between the outer circumferential surface and the inner circumferential surface in the inner space. The reserve tank is configured such that the cooling water introduced into the annular passage through the first opening flows spirally through the annular passage.

DETAILED DESCRIPTION

To begin with, examples of relevant techniques will be described.

A vehicle includes a cooling system configured to cool various portions of the vehicle by circulating a cooling water. Targets cooled by the cooling system includes an internal combustion engine and an auxiliary such as an intercooler. In a passage through which the cooling water circulates in the cooling system, a water pump configured to feed the cooling water and a reserve tank configured to reserve a part of the cooling water are disposed other than the targets described above. When something causes in a shortage of the cooling water, the cooling water is supplied to the passage from the reserve tank. Accordingly, a deterioration of a cooling capacity in response to decreasing in the cooling water is restricted.

When the cooling water circulating through the passage includes bubbles, the cooling efficiency of the cooling water is reduced. Thus, a function to separate and remove the bubbles from the cooling water is needed for the reserve tank. When a flow of the cooling water is disturbed in the reserve tank, the cooling water may generate new bubbles in the reserve tank. Accordingly, a function to restrict generation of bubbles is also needed for the reserve tank.

A reserve tank includes a vapor-liquid separating room that is a space for separating bubbles from the cooling water. The vapor-liquid separating room has a substantially columnar shape. The vapor-liquid separating room defines an inlet and an outlet for the cooling water at a lower part of the vapor-liquid separating room.

The cooling water introduced from the inlet flows upward spirally in the vapor-liquid separating room. Accordingly, not only large babbles, but also small bubbles that have low buoyancy go upward in the spiral flow and vanish at a water surface of the cooling water. The inlet and the outlet are disposed at a lower side of the water surface, so that new bubbles are less likely to be generated in response to introducing the cooling water.

In a configuration in which both of the inlet and the outlet are disposed in a single vapor-liquid separating room, a flow of the cooling water flowing upward from the inlet and a flow of the cooling water flowing downward to the outlet interfere with each other. Thus, a disturbance of the flow of the cooling water may occur. As a result, new bubbles may be generated in the reserve tank. In addition, the disturbance of the cooling water may cause the cooling water introduced from the inlet to flow directly to the outlet without flowing up in the vapor-liquid separating room. In this case, the cooling water is discharged from the outlet without removing the bubbles.

The reserve tank does not always generate the disturbance of the flow of the cooling water described above depending on a flow rate of the cooling water. However, a range of the flow rate in which the flow of the cooling water is stabilized is relatively narrow.

Accordingly, the conventional reserve tank has a room for improving at a point of restricting generation of bubbles and removing bubbles.

It is an object of the present disclosure to provide a reserve tank capable of stably restricting babbles from generating and removing the babbles A reserve tank according to the present disclosure is disposed in a passage through which a cooling water circulates. The reserve tank includes a vapor-liquid separator, an inlet portion, an outlet portion, and a protrusion. The vapor-liquid separator defines therein an inner space for separating a vapor phase and a liquid phase of the cooling water. The inlet portion defines a first opening through which the cooling water is supplied into the inner space. The outlet portion defines a second opening through which the cooling water is discharged from the inner space. The protrusion protrudes upward from a bottom surface of the vapor-liquid separator. An inner circumferential surface of the vapor-liquid separator and an outer circumferential surface of the protrusion are coaxially provided in a cross section along a horizontal surface to define an annular passage between the outer circumferential surface and the inner circumferential surface in the inner space. The reserve tank is configured such that the cooling water introduced into the annular passage through the first opening flows spirally through the annular passage.

The cooling water flowing into the annular passage through the first opening has a relatively fast flow rate and flows upward spirally at an outer circumferential part of the annular passage (i.e., a position near the inner circumferential surface of the vapor-liquid separator). Bubbles in the cooling water vanishes upon reaching at a water surface of the cooling water. As reducing the flow rate, the cooling water flows downward at an inner circumferential part of the vapor-liquid separator. The cooling water flows through the annular passage again and further flows spirally downward at the inner circumferential part of the annular passage (i.e., a position near the outer circumferential surface of the protrusion) to the second opening. The cooling water is discharged outward through the second opening.

Accordingly, the reserve tank in the present disclosure restricts a flow of the cooling water introduced from the first opening and flowing upward spirally from interfering with a flow of the cooling water flowing downward spirally to the second opening. Thus, generation of new bubbles caused by a disturbance of the flow of the cooling water is restricted in the reserve tank. According to inventors' experiments, a range of a flow rate that forms a stable flow of the cooling water without disturbance is wider than a conventional configuration that does not have the protrusion. The flow of the cooling water in the vapor-liquid separator can be stable in a wide flow rate, thereby restricting the generation of bubbles and removing the bubbles sufficiently.

It is an object of the present disclosure to provide a reserve tank capable of stably restricting babbles from generating and removing the babbles Hereinafter, embodiments will be described with reference to drawings. Same reference numerals are assigned to the same components and elements in the drawings and redundant explanations are omitted for descriptive purposes.

A first embodiment will be described. A reserve tank 10 in this embodiment configures a part of a cooling system disposed in a vehicle (not shown). The cooling system cools various parts such as an internal combustion engine and auxiliaries by circulating a cooling water. The cooling water in the cooling system is fed by the water pump and supplied to cooling targets such as the internal combustion engine to cool the cooling targets. The cooling water having a high temperature after passing through the cooling targets is cooled at a radiator, returned to the water pump, and fed by the water pump again. Commonly known configurations can be applied as the cooling system and concrete drawings and explanations on the cooling system are omitted.

The reserve tank 10 is disposed in a passage through which the cooling water circulates in the cooling system. The reserve tank 10 may be disposed at a position upstream side of the water pump. "The passage through which the cooling water circulates" does not mean a passage through which the cooling water is always flowing and the reserve tank 10 may be disposed in a bypass passage through which the cooling water flows temporary. A configuration of the reserve tank 10 will be described with reference to FIGS. 1 and 2.

Figure 1:
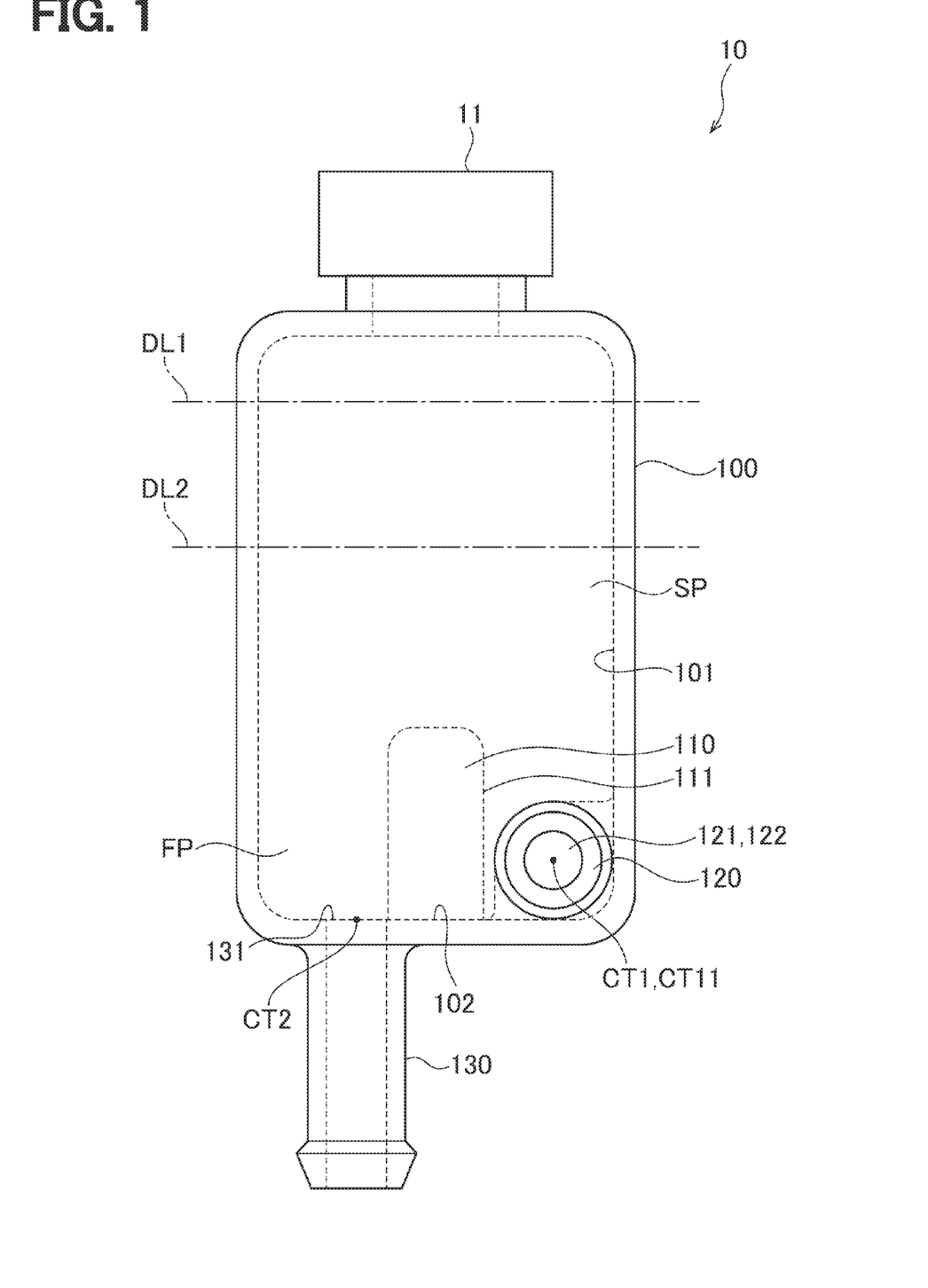
FIG. 1 is a side view of a reserve tank according to a first embodiment.
Figure 2:
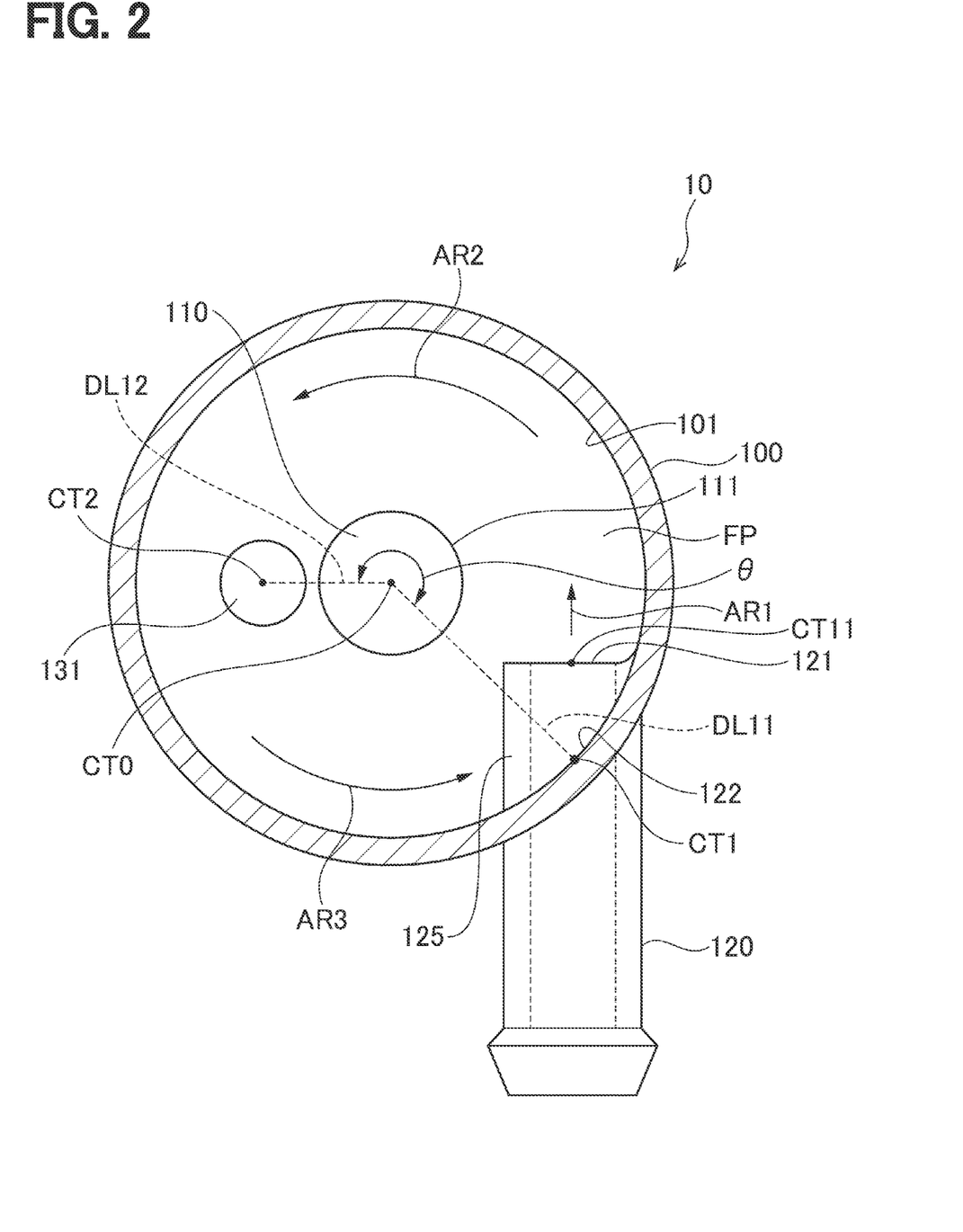
FIG. 2 is a top view showing an inner structure of the reserve tank according to the first embodiment.

FIG. 1 is a side view of the reserve tank 10. In FIG. 1, an inner configuration of the reserve tank 10 is shown with a dot line. FIG. 2 is a top view of the inner configuration of the reserve tank 10. FIG. 2 is a view taken along a horizontal surface of a vapor-liquid separator 100 and viewed from an upper side of the reserve tank 10. The cutting position is, for example, a position shown by a chain line DL2 in FIG. 1.

As shown in FIGS. 1 and 2, the reserve tank 10 includes the vapor-liquid separator 100, an inlet portion 120, and an outlet portion 130.

The vapor-liquid separator 100 reserves the supplied cooling water temporary and removes babbles in the cooling water. The vapor-liquid separator 100 has a substantial columnar shape and a center axis of the vapor-liquid separator 100 extends in an up-down direction. In this embodiment, the vapor-liquid separator 100 takes up almost all of the reserve tank 10 and the reserve tank 10 is configured as a single container. In place of this configuration, the reserve tank 10 may include a reservoir configured to reserve the cooling water in addition to the vapor-liquid separator 100. In this case, the vapor-liquid separator 100 and the reservoir are disposed to be adjacent to each other with a partition therebetween and the partition defines an opening through which the cooling water passes.

The vapor-liquid separator 100 defines therein an inner space SP. The inner space SP is a space for reserving the cooling water temporary and a space for separating a vapor-phase and a liquid-phase of the cooling water to remove bubbles.

The vapor-liquid separator 100 defines an opening for introducing the cooling water into the inner space SP at an upper end of the vapor-liquid separator 100. The opening is normally closed with a cap 11. The cap 11 includes a valve (not shown). When a normal state where pressure in the inner space SP is low, the valve is closed to close the inner space SP from an outside air. When the pressure in the inner space SP increases over a predetermined value, the valve is opened and air in the inner space SP can escape toward the outside.

A protrusion 110 is disposed in the inner space SP. The protrusion 110 protrudes upward from a bottom surface 102 of the vapor-liquid separator 100. In this embodiment, the protrusion 110 has a substantial solid columnar shape as a whole.

A center axis of the protrusion 110 corresponds to a center axis of the vapor-liquid separator 100. Thus, in a cross-section of the vapor-liquid separator 100 taken along the horizontal surface, the inner circumferential surface 101 of the vapor-liquid separator 100 and an outer circumferential surface 111 of the protrusion 110 have circular shapes that are coaxial with each other.

A space around the protrusion 110 in the inner space SP, i.e., a space between the inner circumferential surface 101 of the vapor-liquid separator 100 and the outer circumferential surface 111 of the protrusion 110 is an annular space in a top view. As will be described later, the cooling water flows spirally through the annular space. Hereinafter, the annular space is referred to as an "annular passage FP".

A chain line DL1 shown in FIG. 1 indicates an upper limit of water level of the vapor-liquid separator 100. The chain line DL2 in FIG. 1 indicates a lower limit of water level of the vapor-liquid separator 100. Lines indicating the upper limit and the lower limit of the water level are marked at an outer surface of the vapor-liquid separator 100, so that the upper limit and the lower limit can be recognized. When the cooling water is supplied into the reserve tank 10, an amount of the cooling water supplied to the reserve tank 10 is adjusted such that a water level of the cooling water is set between the lower limit and the upper limit. An upper end of the protrusion 110 is located lower than the lower limit of water level shown by the chain line DL2. Thus, the upper end of the protrusion 110 does not extend beyond the water surface of the cooling water.

The cooling water circulating in the cooling system is introduced from the inlet portion 120 and supplied to the inner space SP. As shown in FIG. 2, the inlet portion 120 has a tubular shape extending straight in the horizontal direction. The inlet portion 120 protrudes outward from the vapor-liquid separator 100. An end of the inlet portion 120 is connected to a pipe (not shown) that configures a circulating passage of the cooling water.

The inlet portion 120 also protrudes inward the vapor-liquid separator 100, i.e., the inlet portion 120 protrudes into the inner space SP, and defines an opening 121 at a tip end of the inlet portion 120. The cooling water flowing through the inlet portion 120 is supplied into the inner space SP through the opening 121. The opening 121 is an opening for supplying the cooling water to the inner space SP, i.e., the opening 121 corresponds to "a first opening" in this embodiment.

The inlet portion 120 is located at a lower portion in the inner space SP. Specifically, the inlet portion 120 is located lower than the upper end of the protrusion 110 and upper than the bottom surface 102 of the vapor-liquid separator 100. The cooling water just flowing out of the opening 121 does not flow directory to the protrusion 110 as shown in an arrow AR1 of FIG. 2. The cooling water flowing out of the opening 121 flows spirally in the annular passage FP as shown in arrows AR2 and AR3 in FIG. 2. Concrete route of the cooling water flowing in the annular passage FP is described later.

The cooling water is discharged outward from the inner space SP through the outlet portion 130. As shown in FIG. 1, the outlet portion 130 has a tubular shape extending straight in the up-down direction and connected to the bottom surface 102 of the vapor-liquid separator 100 at an upper end of the outlet portion 130. The outlet portion 130 protrudes downward from the vapor-liquid separator 100. A tip end of the outlet portion 130 is connected to a pipe (not shown) that configures the passage of the cooling water.

The upper end of the outlet portion 130 (i.e., a part of the outlet portion 130 connected to the bottom surface 102) defines an opening 131. The cooling water in the inner space SP flows into the outlet portion 130 through the opening 131 and discharged to the outside of the vapor-liquid separator 100. The opening 131 is an opening through which the cooling water is discharged from the inner space SP, i.e., the opening 131 corresponds to "a second opening" in this embodiment.

Figure 3:
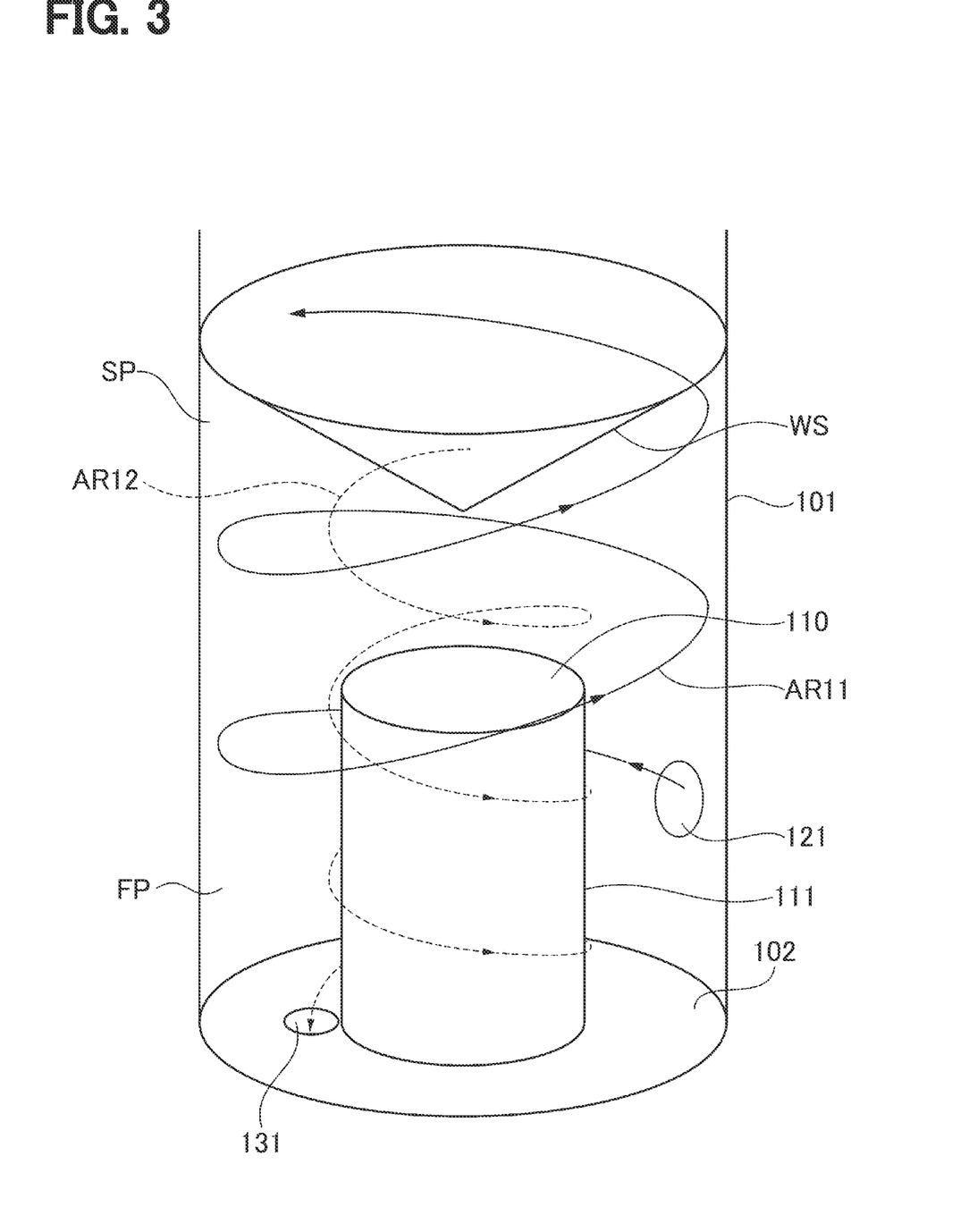
FIG. 3 is a schematic view illustrating a flow of a cooling water in the reserve tank according to the first embodiment.

A flow of the cooling water in the inner space SP will be described with reference to FIG. 3. The flow of the cooling water just after being supplied from the opening 121 is illustrated with a solid arrow AR11. The cooling water flows upward spirally in the annular passage FP.

A flow rate of the cooling water just after being supplied through the opening 121 is relatively fast. Accordingly, the cooling water flows upward spirally in an outer circumferential part of the annular passage FP (i.e., a part of the annular passage FP near the inner circumferential surface 101 of the vapor-liquid separator 100). After the cooling water flows to an upper side of the annular passage FP, the cooling water continues to flow upward spirally near the inner circumferential surface 101.

The cooling water flows spirally, thereby generating so-called swirl at a water surface WS of the cooling water. In FIG. 3, the water surface WS that is concave at a center portion of the water surface due to the swirl is schematically illustrated.

Bubbles in the cooling water joins to air existing above the water surface WS and vanishes upon reaching at the water surface WS. After that, as reducing the flow rate of the cooling water, the cooling water flows downward spirally at the inner circumferential side of the inner space SP. In FIG. 3, a flow direction of the cooling water flowing spirally downward is illustrated with a dotted arrow AR12.

The cooling water flows downward in the annular passage FP. The cooling water flows spirally in the inner circumferential side of the annular space FP (i.e., a part of the annular space FP near the outer circumferential surface 111 of the protrusion 110) and discharged out through the opening 131 of the outlet portion 130.

In this embodiment, the protrusion 110 enables the cooling water to flow easily and spirally around the protrusion 110 in the annular passage FP. Additionally, the cooling water flowing downward to the opening 131 is likely to flow spirally along the outer circumferential surface 111 of the protrusion 110. As a result, an upward spiral flow shown in the arrow AR11 and a downward spiral flow shown in the arrow AR12 are less likely to interfere with each other. Thus, generation of new bubbles in the reserve tank 10 caused from the interference of the flow of the cooling water is restricted. According to inventors' experiments, a range of the flow rate of the cooling water in which the flow of the cooling water is stabilized without interference is wider than that of a conventional configuration that does not have the protrusion 110.

Other features to restrict the interference of the flow of the cooling water will be described. As shown in FIG. 2, the inner circumferential surface 101 defines an opening 122 corresponding to the inlet portion 120. The opening 122 functions as the "first opening" through which the cooling water is supplied to the inner space SP, similarly to the opening 121 described above. In following, not the opening 121 but the opening 122 is taken as the first opening and a configuration of the reserve tank 10 will be described.

In FIG. 2, the inlet portion 120 includes an interference prevention wall 125 protruding into the inner space SP. The interference prevention wall 125 is a wall protruding from an edge of the opening 122 (i.e., the first opening) to the inner space SP.

As described before, the cooling water flowing into the inner space SP from the inlet portion 120 has a fast flow rate and flows spirally in the outer circumferential part of the annular passage FP. Thus, a part of the cooling water flows toward the opening 122 as shown in the arrow AR3 while flowing spirally in the annular passage FP. If the inlet portion 120 does not include the interference prevention wall 125, the flow of the cooling water toward the opening 122 along the arrow AR3 may interfere with the flow of the cooling water just after being introduced from the opening 122. Thus, the flow of the cooling water may be disturbed.

The reserve tank 10 in this embodiment includes the interference prevention wall 125 that surrounds the opening 122. The flow of the cooling water toward the opening 122 along the arrow AR3 is restricted to interfere with the flow of the cooling water just after entering through the opening 122 by the interference prevention wall 125.

The reserve tank 10 in this embodiment includes the interference prevention wall 125 to restrict the flow of the cooling water flowing spirally in the annular passage FP to interfere with the flow of the cooling water just after being introduced to the inner space SP through the opening 122.

Regarding the function of the interference prevention wall 125 described above, the interference prevention wall 125 does not necessary protrude from a whole circumference edge of the opening 122. The interference prevention wall 125 may protrude only from a left side of the circumference edge of the opening 122 as a minimal wall for blocking the flow of the cooling water shown in the arrow AR3. That is, the interference prevention wall 125 may not have a front part and a right part shown in FIG. 2.

In FIGS. 1 and 2, a center CT11 of the opening 121, a center CT1 of the opening 122, and a center CT2 of the opening 131 are shown. A center means that a center of the openings 121, 122, and 131 that have circular shapes. If the openings 121, 122, and 131 do not have circular shapes, a center means a gravity center.

As shown in FIG. 1, the center CT1 of the opening 122 is located upper than the center CT2 of the opening 131 in the reserve tank 10. That is, the center CT1 of the first opening that is an inlet of the cooling water is located upper than the center CT2 of the second opening that is an outlet of the cooling water. The positional relationship described above is the same when the opening 121 is taken as the first opening.

In this embodiment, since the first opening and the second opening are arranged as described above, the fast flow of the cooling water introduced from the first opening is restricted from interfering with the flow of the cooling water just before entering into the second opening. Therefore, new bubbles caused from the disturbance of the flows of the cooling water are further reduced.

FIG. 2 shows a center CT0 showing a center axis of the protrusion 110, a dotted line DL11 connecting between the center CT0 and the center CT1, and a dotted line DL12 connecting between the center CT0 and the center CT2. In this embodiment, the dotted line DL12 is shorter than the dotted line DL11.

When the reserve tank 10 in this embodiment is viewed in the up-down direction, a distance between the center CT2 of the second opening and the center CT0 of the protrusion 110 is less than a distance between the center CT1 of the first opening and the center CT0 of the protrusion 110. In other words, the opening 131 that is the outlet of the cooling water is located at an inner side of the opening 122 that is the inlet of the cooling water. Thus, the flow of the cooling water flowing spirally in the inner space SP toward the opening 131 is less likely to interfere with the flow of the cooling water flowing upward spirally in the outer side of the inner space SP.

In FIG. 2, the dotted line DL11 and the dotted line DL12 form an angle θ therebetween. The angle θ is an angle from the center CT1 of the opening 122 (i.e., the first opening) to the center CT2 of the opening 131 (i.e., the second opening) along the annular passage FP in the flow direction of the cooling water. In this embodiment, positions of the opening 122 and the opening 131 are determined such that the angle θ is equal to or greater than 90 degrees. The positional relationship is satisfied when the opening 121 is taken as the first opening.

When the angle θ is less than 90 degrees, the first opening located too close to the second opening, which may cause the flow of the cooling water flowing from the first opening to interfere with the flow of the cooling water flowing to the second opening. A part of the cooling water flowing through the first opening may be discharged through the second opening without flowing upward. According to the inventors' experiments, the interference of the flows described above can be sufficiently suppressed when the angle θ is equal to or greater than 90 degrees.

As mentioned before, the upper end of the protrusion 110 is located at a position lower than the lower limit of the water level shown in the chain line DL2 in FIG. 1. The protrusion 110 does not extend beyond the water surface WS, thus the generation of the swirl is not interfered. Thus, the disturbance of the cooling water is further reduced.

A second embodiment will be described with reference to FIG. 4. Hereinafter, different portions from the first embodiment are mainly described and explanations of common portions with the first embodiment will be appropriately omitted.

Figure 4:
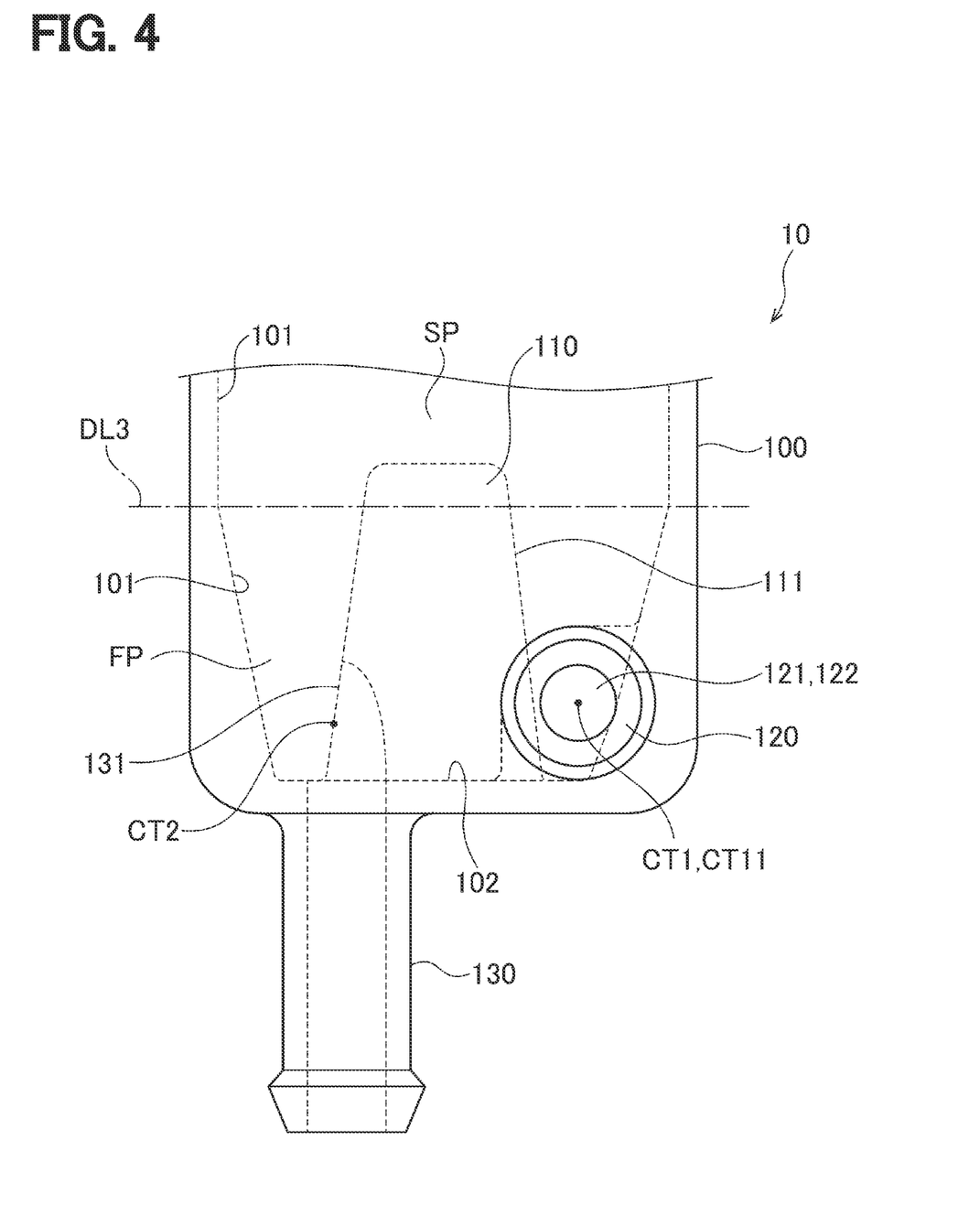
FIG. 4 is a partial side view of a reserve tank according to a second embodiment.

FIG. 4 is a side view of a lower part of a reserve tank 10 in this embodiment, similarly to FIG. 1. As shown in FIG. 4, the inner circumferential surface 101 of the vapor-liquid separator 100 does not entirely have a cylindrical shape in this embodiment. A part of the inner circumferential surface 101 below a chain line DL3 tapers in a direction downward to the bottom surface 102. That is, an inner area defined by the inner circumferential surface 101 in a cross section along the horizontal surface decreases in the direction toward the bottom surface 102.

The cooling water flowing into the annular passage FP through the inlet portion 120 hit with the tapered surface of the inner circumferential surface 101 and flows upward smoothly. Thus, the tapered surface can generate a stable spiral flow of the cooling water flowing upward.

The inner circumferential surface 101 may include the tapered surface only at the lower part like in this embodiment, but the inner circumferential surface 101 may taper entirely in the up-down direction.

In this embodiment, a shape of the cross section of the outer circumferential surface 111 of the protrusion 110 taken along the horizontal surface decreases in a direction toward the upper end of the protrusion 110. That is, the protrusion 110 in this embodiment has a shape in which an upper end of a circular cone is cut along the horizontal surface.

In this embodiment, the cooling water flowing downward as shown in the arrow AR12 of FIG. 2 is more likely to be guided along the outer circumferential surface 111 of the protrusion 110. Thus, the disturbance of the cooling water is further reduced.

In this embodiment, compared to the first embodiment in FIG. 1, the outlet portion 130 is located closer to a center of the bottom surface 102. A passage defined in the outlet portion 130 extends to pass through the protrusion 110 in the up-down direction. As a result, a part of the opening 131 is defined by the outer circumferential surface 111 of the protrusion 110.

According to such configuration, the cooling water flowing downward along the outer circumferential surface 111 of the protrusion 110 flows into the opening 131 without departing from the outer circumferential surface 111. Thus, the flow of the cooling water just after flowing through the opening 121 is further restricted from interfering with the flow of the cooling water just before entering into the opening 131.

The part of the opening 131 (i.e., the second opening) is defined by the outer circumferential surface 111 of the protrusion 110 in this embodiment, but a whole of the opening 131 may be defined by the outer circumferential surface 111 of the protrusion 110.

The inner circumferential surface 101, the protrusion 110, and the outlet portion 130 described above may be respectively applied to the reserve tank 10. When a part or whole part of the opening 131 is defined by the outer circumferential surface 111 of the protrusion 110, the inner circumferential surface 101 may entirely have a cylindrical shape similarly to the first embodiment and the protrusion 110 may have the solid columnar shape similarly to the first embodiment.

A third embodiment will be described with reference to FIG. 5. Hereinafter, different portions from the first embodiment will be mainly described and explanations of the common portions with the first embodiment will be appropriately omitted.

Figure 5:
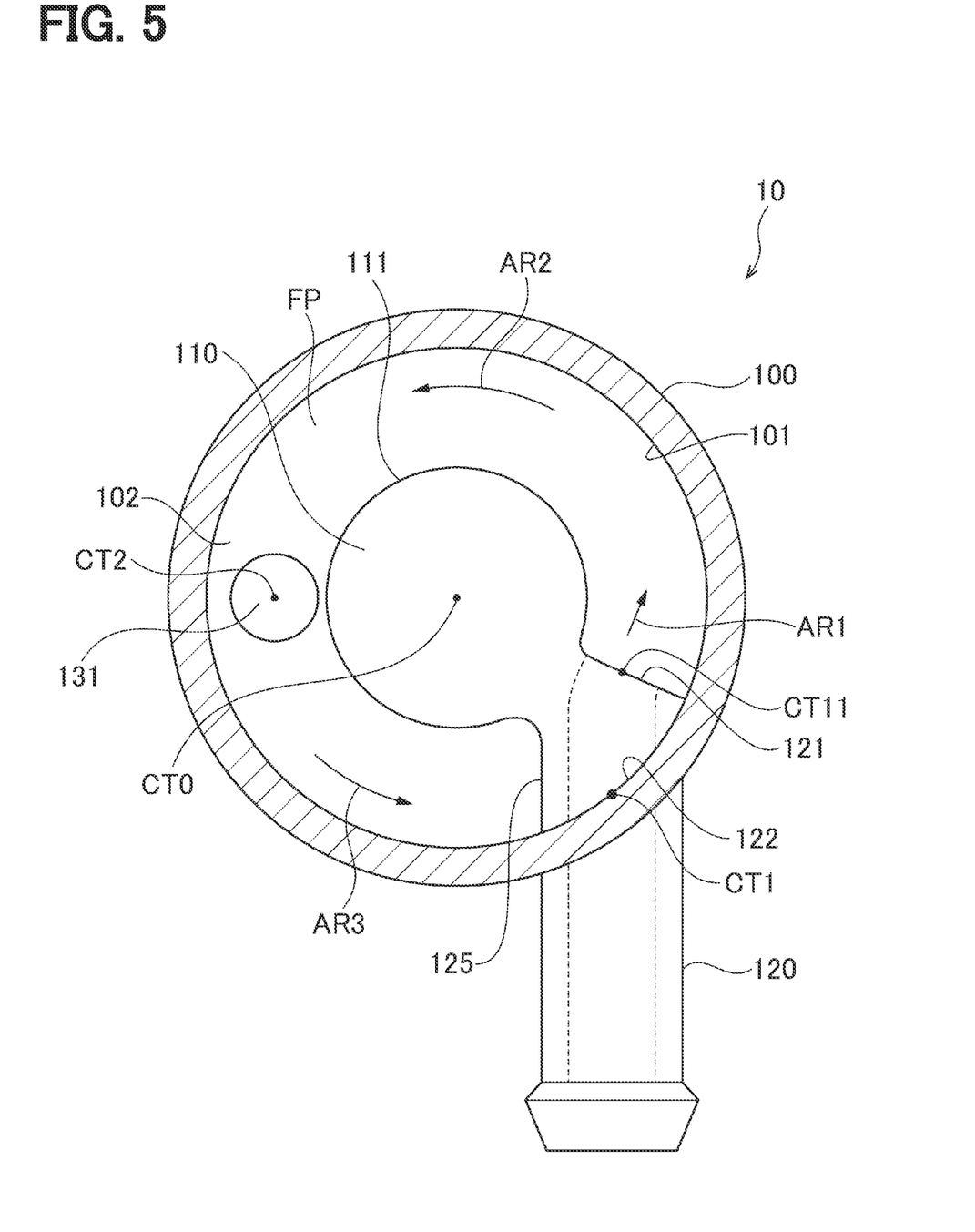
FIG. 5 is a top view of a reserve tank according to a third embodiment.

FIG. 5 is a top view of a reserve tank 10 in this embodiment, similarly to FIG. 2. As shown in FIG. 5, the inlet portion 120 protrudes from the inner circumferential surface 101 into the inner space SP and a part of the inlet portion 120 is connected to the outer circumferential surface 111 of the protrusion 110. The reserve tank 10 in this embodiment includes the interference prevention wall 125 extending further into the inner space SP and a part of the interference prevention wall 125 is connected to the outer circumferential surface 111 of the protrusion 110. In this embodiment, the interference prevention wall 125 restricts the cooling water flowing spirally in the annular passage FP from interfering with the flow of the cooling water just after entering into the inner space SP through the opening 122 (i.e., the first opening), similarly to the first embodiment.

A part or all parts of configurations of the inner circumferential surface 101, the protrusion 110, and the outlet portion 130 can apply similar configurations in the second embodiment. It is preferable that the first opening and the second opening be located such that the distance between the center CT2 of the second opening and the center CT0 is shorter than the distance between the center CT1 of the first opening and the center CT0.

A fourth embodiment will be described with reference to FIG. 6. Hereinafter, different portions from the first embodiment will be mainly described and explanations of common portions with the first embodiment will be appropriately omitted.

Figure 6:
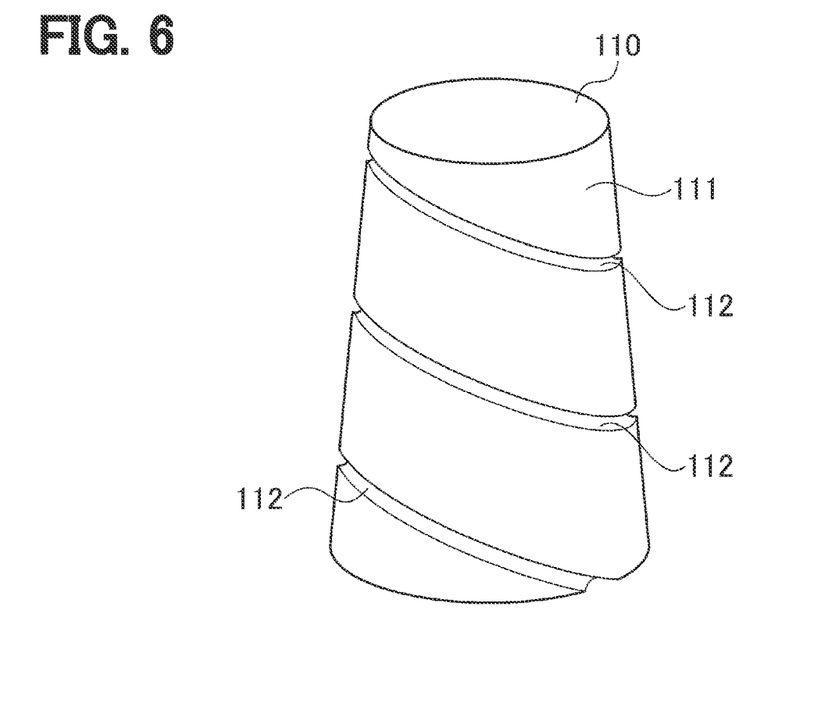
FIG. 6 is a diagram showing a shape of a protrusion of a reserve tank according to a fourth embodiment.

FIG. 6 is a perspective view of a protrusion 110 disposed in the reserve tank 10 according to this embodiment. As shown in FIG. 6, an area of the cross section of the protrusion 110 cut along the horizontal surface deceases in a direction toward the upper end, similarly to the second embodiment in FIG. 4.

Additionally, the outer circumferential surface 111 of the protrusion 110 includes a recess 112 that have a spiral shape. The recess 112 is recessed from the outer circumferential surface 111. A direction in which the recess 112 extends is the flow direction of the cooling water flowing spirally downward as shown in the arrow AR12 in FIG. 3.

The outer circumferential surface 111 of the protrusion 110 includes the recess 112 to stabilize the cooling water flowing spirally downward along the outer circumferential surface 111 and reduce bubbles caused from the disturbance of the flow.

The configuration of the protrusion 110 in this embodiment may be combined with other embodiments described before. The protrusion 110 may have the solid columnar shape having the spiral recess 112 on the outer circumferential surface 111.

Figure 7:
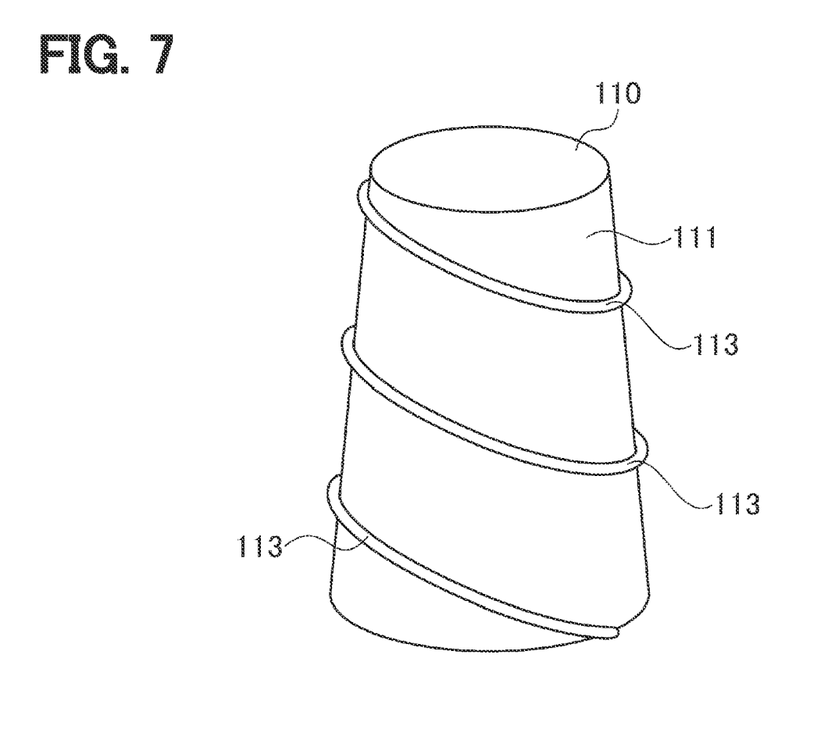
FIG. 7 is a diagram showing the shape of a protrusion of a reserve tank according to a modified example of the fourth embodiment.

FIG. 7 is a perspective view of a protrusion 110 disposed in the reserve tank 10 according to a modified example of the fourth embodiment. The outer circumferential surface 111 of the protrusion 110 may include a projection 113 that have a spiral shape in place of the recess 112. The projection 113 protrudes from the outer circumferential surface 111. Similar effects with the fourth embodiment can be obtained with this modified example.

A fifth embodiment will be described with reference to FIG. 8. Hereinafter, different portions from the second embodiment in FIG. 4 will be mainly described and explanations of common portions with the second embodiment will be appropriately omitted.

Figure 8:
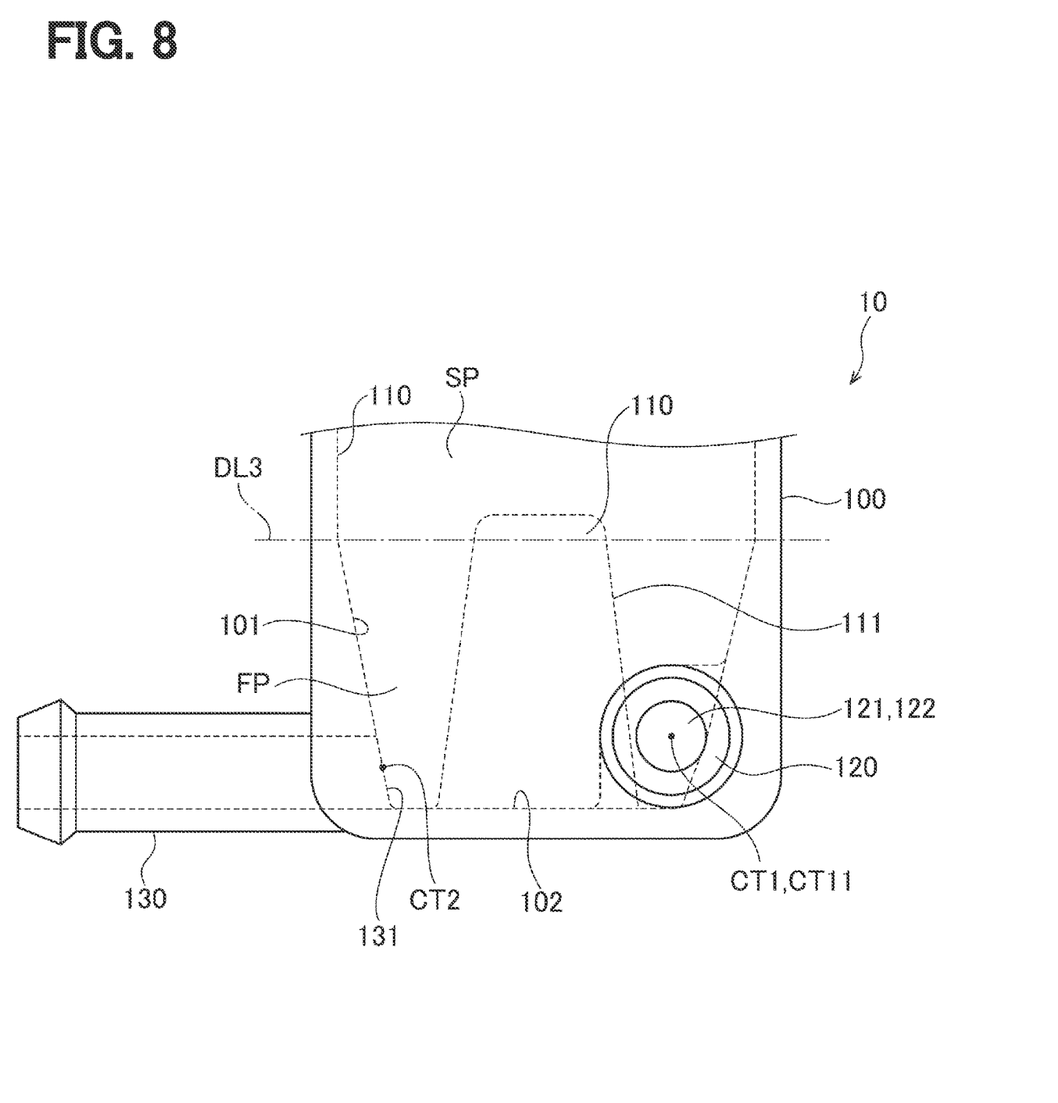
FIG. 8 is a partial side view of a reserve tank according to a fifth embodiment.

FIG. 8 is a side view of a lower part of a reserve tank 10 according to this embodiment, similarly to FIG. 4. As shown in FIG. 8, the outlet portion 130 have a tubular shape extending straight in the horizontal direction. An end of the outlet portion 130 is connected to an outer surface of the vapor-liquid separator 100. The opening 131 (i.e., the second outlet) is defined by the inner circumferential surface 101 of the vapor-liquid separator 100. The center CT2 of the opening 131 (i.e, the second opening) is located at a position lower than the center CT1 of the opening 122 (i.e, the first opening) also in this embodiment.

As described above, it is preferable that the second outlet that is the outlet for the cooling water be located at a position of the bottom surface 102 closer to the protrusion 110. However, when the bottom surface 102 has a difficulty in defining the second opening because of spatial limitations from pipes and the like in the vehicle, the configuration in this embodiment can be adopted. The outlet portion 130 in this embodiment can be combined with configurations in other embodiments described before.

A sixth embodiment will be described with reference to FIG. 9. Hereinafter, different portions from the first embodiment will be mainly described and explanations of common portions with the first embodiment will be appropriately omitted.

Figure 9:
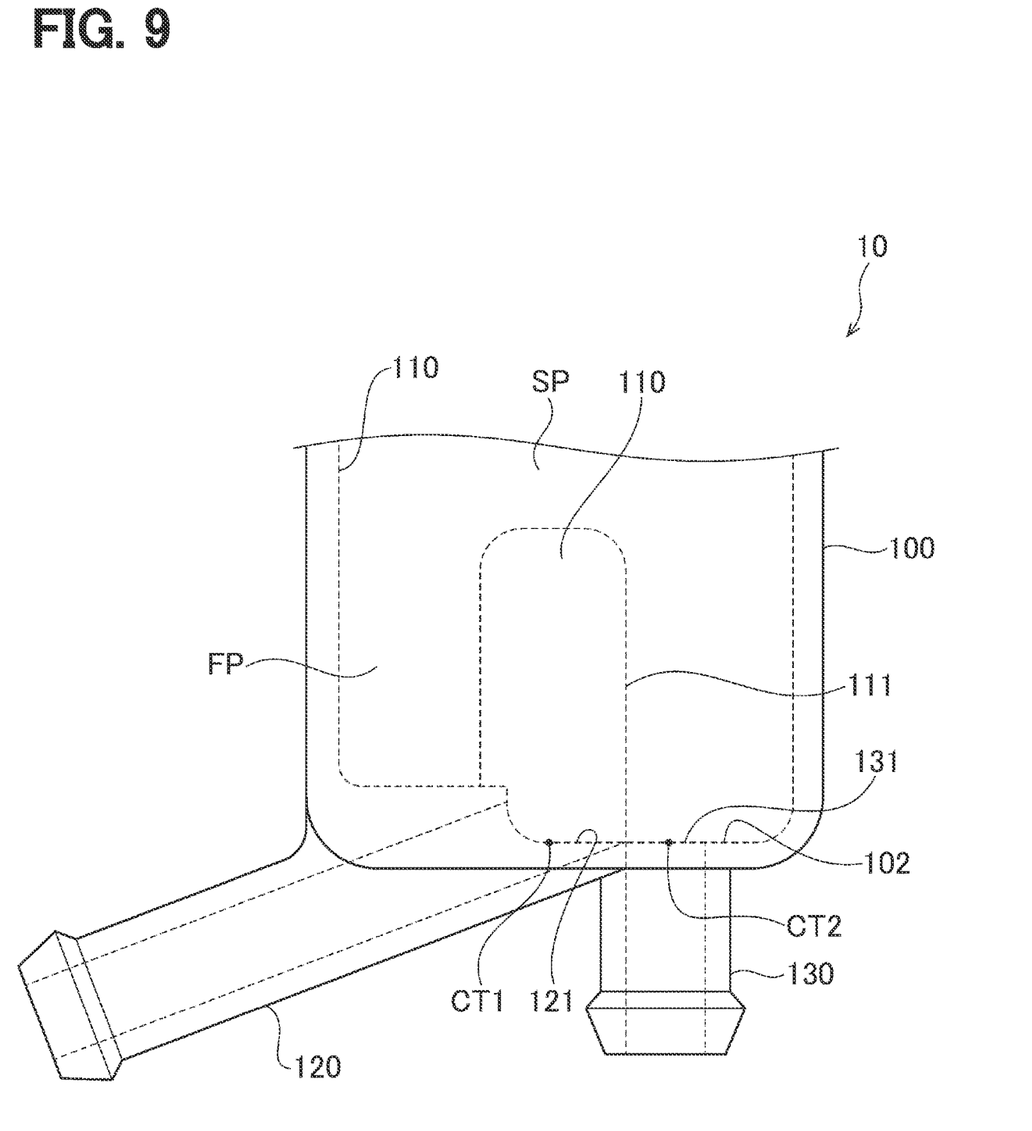
FIG. 9 is a partial side view of a reserve tank according to a sixth embodiment.

FIG. 9 is a side view of a lower part of a reserve tank 10 in this embodiment, similarly to FIG. 1. As shown in FIG. 9, the inlet portion 120 has a tubular shape extending straight in a tilted direction relative to the horizontal surface. An upper end of the inlet portion 120 is connected to the bottom surface 102 of the vapor-liquid separator 100 in a tilted direction relative to the bottom surface 102. The opening 121 (i.e., the first opening) is defined at the bottom surface 102 of the vapor-liquid separator 100.

As described before, it is preferable that the first opening that is the inlet of the cooling water be located such that the center CT1 of the first opening is located at a position upper than the center CT2 of the second opening. However, when the first opening is difficult to be located at a position described above because of spatial limitations from pipes and the like in the vehicle, the configuration in this embodiment can be adopted. The inlet portion 120 in this embodiment can be combined with configurations in other embodiments described before.

Figure 10:
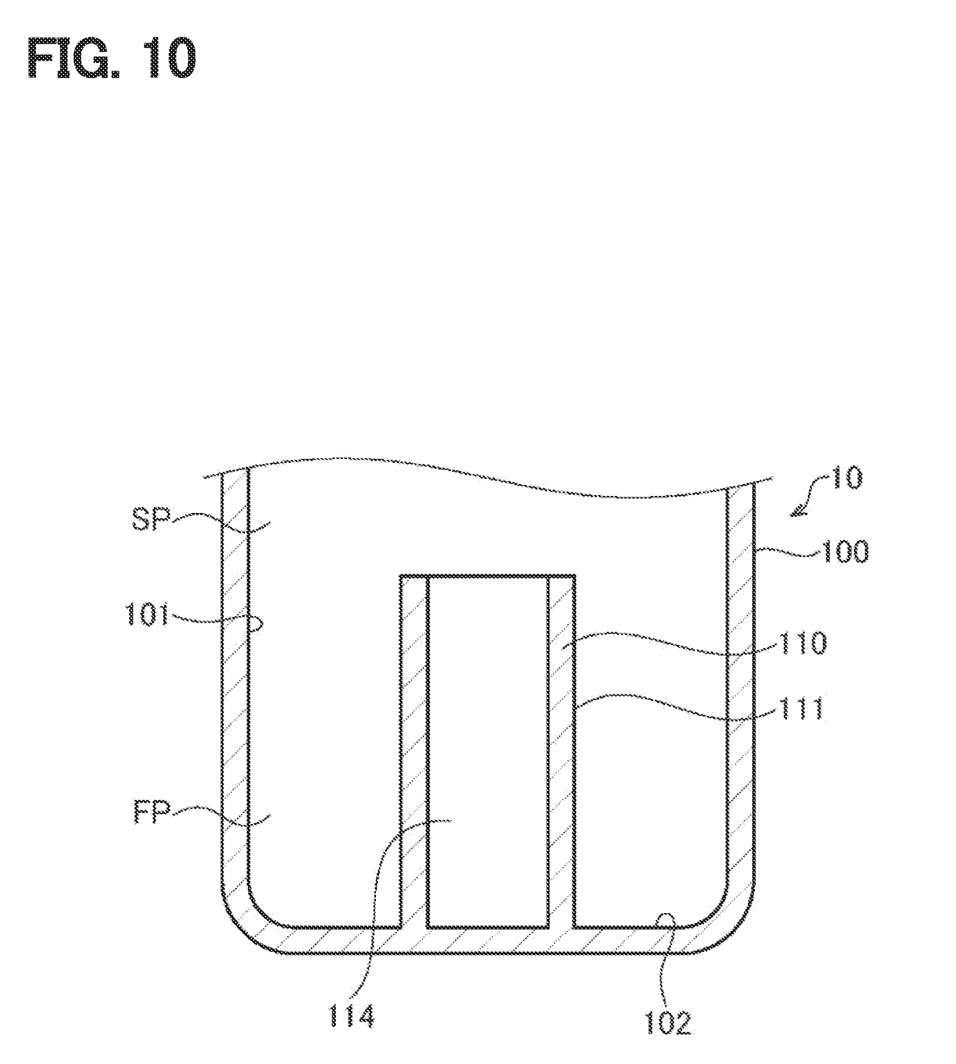
FIG. 10 is a partial side view of a reserve tank according to a seventh embodiment.

With reference to FIG. 10, a seventh embodiment will be described. Hereinafter, different portions from the first embodiment will be mainly described and explanations of common portions with the first embodiment will be appropriately omitted.

A reserve tank 10 in this embodiment is different from the first embodiment in a shape of the protrusion 110. FIG. 10 is a cross-sectional view of the reserve tank 10 of the present embodiment taken along a surface patting through a center axis of the reserve tank 10. Illustrations of the inlet portion 120 and the outlet portion 130 defined in the reserve tank 10 are omitted.

As shown in FIG. 10. in the reserve tank 10 of the present embodiment, the protrusion 110 protruding upward from the bottom surface 102 of the inner space SP has a cylindrical tubular shape not the solid columnar shape. That is, the protrusion 110 defined therein an inner space 114 and the inner space 114 opens to the inner space SP at an upper end of the protrusion 110. Even in such a configuration, the same effects as those described in the first embodiment can be obtained. The shape of the protrusion 110 in this embodiment can be combined with configurations in other embodiments described before.

The present disclosure is described with reference to concrete examples. However, the present disclosure is not limited to these concrete examples. The present disclosure includes alternations from concrete examples by a person in the art as long as including technical features in this disclosure. Elements of the concrete examples, positions, conditions, and shapes thereof are not limited to the description above, but can be modified appropriately. The elements of the concrete examples can be combined with each other unless generating technical contradictions.

What is claimed is:

1. A reserve tank disposed in a passage through which a cooling water circulates, the reserve tank comprising:
   a vapor-liquid separator that defines an inner space for separating a vapor phase and a liquid phase of the cooling water,
   an inlet portion that defines a first opening through which the cooling water is supplied into the inner space,
   an outlet portion that defines a second opening through which the cooling water is discharged from the inner space, and
   a protrusion that protrudes upward from a bottom surface of the vapor-liquid separator, wherein
   an inner circumferential surface of the vapor-liquid separator and an outer circumferential surface of the protrusion are coaxially provided in a cross-section taken along a horizontal surface to define an annular passage between the inner circumferential surface and the outer circumferential surface in the inner space, and
   the cooling water introduced from the first opening flows spirally in the annular passage.

2. The reserve tank according to claim 1, wherein a center of the first opening is located at an upper side of a center of the second opening.

3. The reserve tank according to claim 1, wherein the protrusion has a cylindrical tubular shape.

4. The reserve tank according to claim 1, wherein an area defined by the outer circumferential surface of the protrusion in the cross section taken along the horizontal surface decreases in a direction toward an upper side of the reserve tank.

5. The reserve tank according to claim 1, wherein the outer circumferential surface of the protrusion includes a recess or a projection each of which has a spiral shape.

6. The reserve tank according to claim 1, further comprising
   an interference prevention wall configured to restrict a flow of the cooling water flowing spirally in the annular passage from interfering with a flow of the cooling water just after being supplied into the inner space through the first opening.

7. The reserve tank according to claim 1, wherein the inlet portion protrudes from the inner circumferential surface of the vapor-liquid separator into the inner space, and
   a part of the inlet portion is connected to the protrusion.

8. The reserve tank according to claim 1, wherein at least a part of the second opening is defined by the outer circumferential surface of the protrusion.

9. The reserve tank according to claim 1, wherein in the cross-section taken along the horizontal surface, an area defined by a lower part of the inner circumferential surface of the vapor-liquid separator decreases in a direction toward the bottom surface of the vapor-liquid separator.

10. The reserve tank according to claim 1, wherein an upper end of the protrusion is located on a lower side of a lower limit of water level in the vapor-liquid separator.

11. The reserve tank according to claim 1, wherein when the reserve tank is viewed in an up-down direction, a distance between a center of the second opening and a center of the protrusion is less than a distance between a center of the first opening and the center of the protrusion.

12. The reserve tank according to claim 1, wherein when the reserve tank is viewed in an up-down direction, an angle from a center of the first opening to a center of the second opening along the annular passage is equal to or greater than 90 degrees.

13. The reserve tank according to claim 1, wherein the bottom surface of the vapor-liquid separator defines the first opening.

14. The reserve tank according to claim 1, wherein the inner circumferential surface of the vapor-liquid separator defines the second opening.

\* \* \* \* \*